(12) United States Patent
Edara et al.

(10) Patent No.: US 9,131,476 B2
(45) Date of Patent: Sep. 8, 2015

(54) OPTIMIZING VOICE CALLS ON PACKET SWITCHED NETWORKS

(75) Inventors: Kiran K. Edara, Cupertino, CA (US); Pratima Vallurupalli, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 111 days.

(21) Appl. No.: 13/211,224

(22) Filed: Aug. 16, 2011

(65) Prior Publication Data

US 2013/0044613 A1 Feb. 21, 2013

(51) Int. Cl.
*H04W 76/02* (2009.01)
*H04W 48/18* (2009.01)

(52) U.S. Cl.
CPC ............ *H04W 76/026* (2013.01); *H04W 48/18* (2013.01); *H04W 76/02* (2013.01)

(58) Field of Classification Search
CPC .... H04W 76/026; H04W 48/18; H04W 76/02
USPC ................ 370/252, 320, 328; 455/423, 435.1
See application file for complete search history.

(56) References Cited

U.S. PATENT DOCUMENTS

| | | | |
|---|---|---|---|
| 2008/0002604 A1* | 1/2008 | Wilborn et al. | 370/320 |
| 2010/0113010 A1* | 5/2010 | Tenny et al. | 455/423 |
| 2010/0255849 A1* | 10/2010 | Ore | 455/450 |
| 2011/0090872 A1* | 4/2011 | Dahlen et al. | 370/332 |
| 2011/0274046 A1* | 11/2011 | Rune et al. | 370/328 |
| 2012/0202480 A1* | 8/2012 | Franklin et al. | 455/423 |
| 2012/0270546 A1* | 10/2012 | Yoon et al. | 455/435.1 |

\* cited by examiner

*Primary Examiner* — Man Phan
*Assistant Examiner* — Mandish Randhawa
(74) *Attorney, Agent, or Firm* — Lowenstein Sandler LLP (57) ABSTRACT

Methods and systems for optimizing voice call setup times for user devices. A user device that is registered to a packet switched network and in an idle state receives a command to establish a voice call. The user device selects a legacy cell of a circuit switched network. The user device then establishes a radio connection with the selected legacy cell without first establishing a radio connection with a serving cell of the packet switched network.

25 Claims, 8 Drawing Sheets

OPTIMIZING VOICE CALLS ON PACKET SWITCHED NETWORKS

BACKGROUND

There are numerous different wireless communication networks with which user devices such as electronic book readers, cellular telephones, personal digital assistants (PDAs), portable media players, tablet computers and netbooks may connect. Each of these wireless communication devices may use different wireless communication technologies. Wireless communication technologies are roughly categorized into first generation (1G), second generation (2G), third generation (3G) and fourth generation (4G) wireless communication technologies. One emerging 4G wireless communication technology is 3rd Generation Partnership Project (3GPP) long term evolution (LTE), commonly referred to simply as LTE.

LTE is a packet switched network technology that supports only packet services, and does not support circuit switched services. Traditional voice calls are circuit switched services. Voice over internet protocol (VOIP) is a packed switched service for enabling voice communication in a packet switched network. Accordingly, when a device that is connected to an LTE network is to make a voice call, it can either user VOIP over LTE (VOLTE) or perform a circuit switched fallback. Most LTE networks currently do not support VOLTE. Therefore, a majority of LTE networks rely on circuit switched fallback to enable voice communications.

Circuit switched fallback is a procedure to transfer a device from an LTE network to a legacy network such as a 3G network or a 2G network. As circuit switched fallback is currently implemented, to perform circuit switched fallback, a user device must have an active radio connection to the LTE network. This means that a user device that is in an idle state must first establish a connection to the LTE network and then wait for the LTE network to transfer the connection to a legacy network before a voice call can be initiated. This can delay the initiation of a voice call by a second or more.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Methods and systems for optimizing voice call setup times for user devices are disclosed. In one embodiment, a user device that is registered to a long term evolution (LTE) network or other packet switched wireless communication network and in an idle state receives a command to establish a voice call. The command may be received based on a user interaction with the user device, or may be received in a message from the LTE network. The user device selects a legacy cell of a circuit switched network. The legacy cell may be detected and/or measured before or after the command to establish the voice call is received. Additionally, the legacy cell may be preselected based on the detection and/or measurement data prior to receiving the command. Alternatively, the legacy cell may be selected after receiving the command. The user device then establishes a radio connection with the selected legacy cell without first establishing a radio connection with a serving cell of the packet switched network.

By selecting a cell of a circuit switched network autonomously, and connecting to a circuit switched network without first connecting to an LTE network (or other packet switched network), a user device may reduce the setup time for a voice call by up to approximately 1 second. This leads to an improved user experience. Additionally, resources of the packet switched network are freed, because connections to the packet switched network are reduced.

Figure 1:
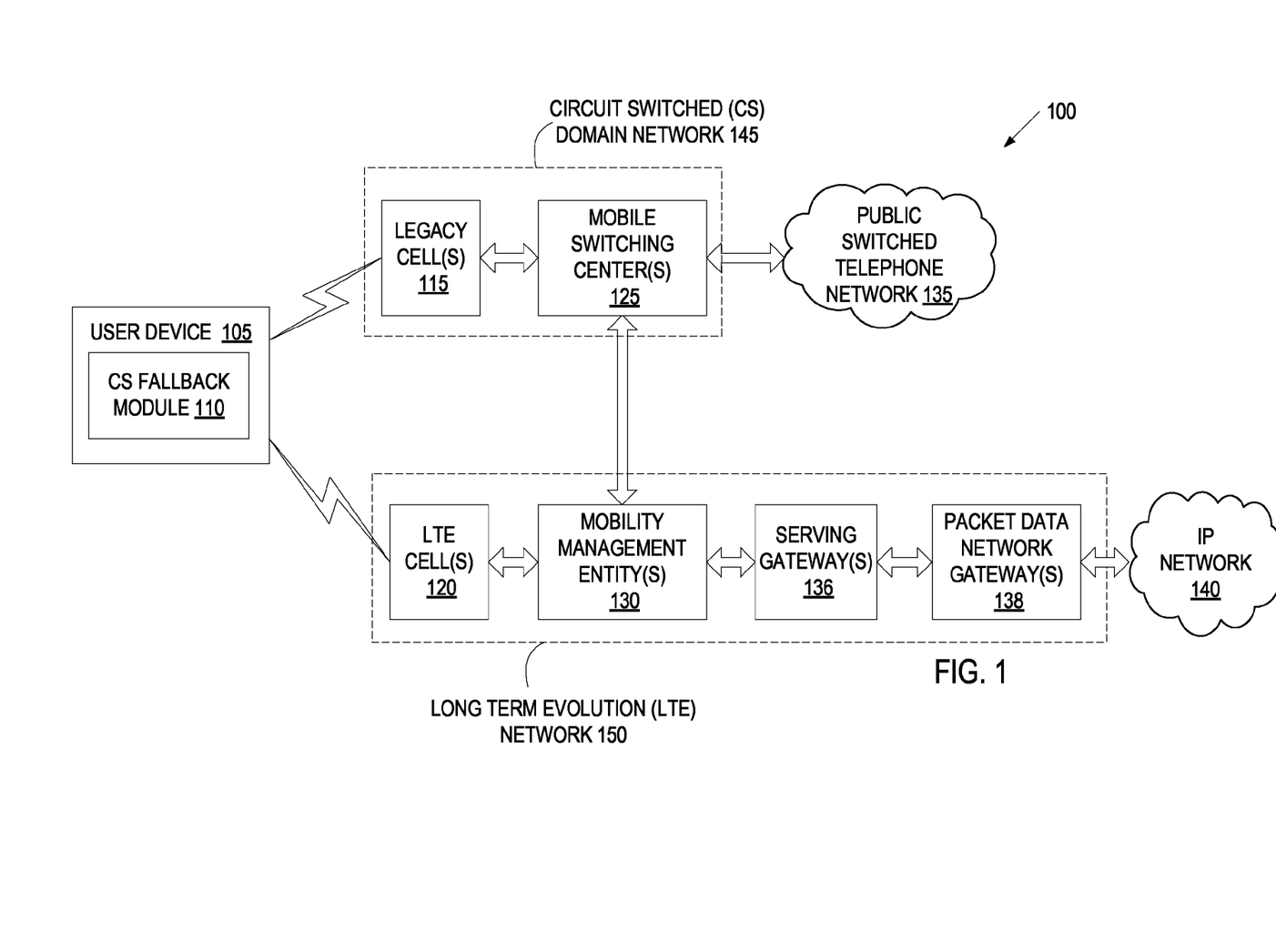
FIG. 1 is a block diagram of an exemplary network architecture in which embodiments of the invention may operate.

FIG. 1 is a block diagram of an exemplary network architecture 100, in which embodiments of the invention may operate. The network architecture 100 may include a user device 105 that may communicate with one or both of a circuit switched (CS) domain network 145 (also referred to simply as a circuit switched network) and a long term evolution (LTE) network 150. Note that though embodiments of the present invention are described with reference to LTE networks, embodiments of the present invention are also applicable to other packet switched networks.

User device 105 may include any type of computing device such as electronic book readers, portable digital assistants, mobile phones, laptop computers, portable media players, tablet computers, cameras, video cameras, netbooks, notebooks, desktop computers, gaming consoles, DVD players, media centers, and the like. User device 105 may include functionality to enable voice communication, data communication and/or consumption of one or more types of media items. The media items may be any type or format of digital content, including, for example, electronic texts (e.g., eBooks, electronic magazines, digital newspapers), digital audio (e.g., music, audible books), digital video (e.g., movies, television, short clips), images (e.g., art, photographs), multimedia content and software updates.

CS domain network 145 may be any 2G or 3G wireless communication network. For example, CS domain network 145 may be a Global System for Mobile Communication (GSM) network, an Interim Standard 95 (IS-95) network, a Universal Mobile Telecommunications System (UMTS) network, a Code Division Multiple Access 2000 (CDMA2000) network, or other wireless network. CS domain network 145 includes multiple legacy cells 115 arranged over a geographic area, each of which is assigned a set of frequencies to use for radio communications. Each legacy cell 115 has a coverage area, and handles communications with user devices 105 in that area. A legacy cell 115 is defined herein as a cell for a 2G or 3G wireless communication network. The legacy cells 115 may be components of a base station subsystem (BSS) (not shown) responsible for handling traffic and signaling between user devices and mobile switching centers 125.

The CS domain network 145 additionally includes multiple mobile switching centers (MSCs) 125, each of which controls a set of legacy cells 115. The MSCs 125 are responsible for routing circuit switched services such as voice calls, short message service (SMS) messages, conference calls, faxes, and so on. The MSCs 125 may include hardware MSCs as well as mobile switching center servers (MSS), which are soft switch variants of the MSCs. The term MSC will be used herein to refer to both traditional MSCs and MSSes. The MSCs 125 connect to a public switched telephone network 135, enabling voice communication with additional user devices and/or traditional telephones outside of the CS domain network 145.

The LTE network 150 includes multiple LTE cells 120, mobility management entities (MMEs) 130, serving gateways (SGWs) 136 and packet data network gateways (PGWs), among other components. The LTE cells 120 are arranged over a geographic area, and each LTE cell 120 is assigned a set of frequencies to use for radio communications. LTE cells 120 may have overlapping coverage with legacy cells 115. Each LTE cell 120 includes an Evolved NodeB (eNodeB) (not shown), which is an enhanced base station that performs radio resource management. The eNodeBs are components of an LTE base station subsystem.

MMEs 130 are key control nodes for the LTE network 150. Each MME 130 controls a set of LTE cells 120. MMEs 130 are responsible for tracking user devices 105 in an idle state, as well as choosing serving gateway (SGWs) 136 for user devices 105. Additionally, MMEs 130 provide functionality to hand over connected user devices 105 to a CS domain network 145.

SGWs 136 are responsible for routing and forwarding data packets for user devices 105. Additionally, SGWs 136 act as an anchor during handovers between LTE cells 120 and between the LTE network 150 and a CS domain network 145. PGWs 138 provide connectivity from the user devices 105 to internet protocol (IP) networks 140 (e.g., the Internet or an intranet) or other external packet networks.

User device 105 registers with LTE network 150. In one embodiment, user device 105 selects a serving cell prior to registering with the LTE network 150. The serving cell is a cell that the user device 105 selects for communicating with the LTE network 150. Registration may be performed when the user device 105 powers on, when the user device 105 enters a geographic area covered by the LTE network 150, and/or at other times. When the user device 105 registers with the LTE network 150, the user device 105 is assigned to an MME 130 (e.g., the MME 130 that controls an LTE cell 120 closest to the user device 105).

Once registered to the LTE network 150, the user device 105 enters a connected state (also referred to as an active state or LTE-connected state), in which the user device 105 has an active radio connection with an LTE cell 120. While the user device 105 is in the connected state, the LTE network 150 knows which LTE cell 120 to which the user device 105 belongs, and can transmit data to and receive data from the user device 105.

If the user device 105 is not sending or receiving any data, the user device enters an idle state (also referred to as an LTE-idle state). The idle state is a power conservation state for the user device 105, in which the user device typically does not transmit or receive any packets. While the user device 105 is in the idle state, the LTE network 140 knows which MME 130 is assigned to the user device and a tracking area list (consisting of multiple LTE cells 120) in which the user device 105 is located. However, the LTE network 150 does not know a specific LTE cell 120 at which the user device 105 is located.

A user of the user device 105 may initiate a voice call while the user device 105 is in the idle state or while the user device 105 is in the connected state. If the user device 105 is in the connected state, then the MME 130 assigned to the user device 105 performs a handover procedure called circuit-switched fallback to set up a connection between the user device and an MSC 125 of a CS domain network 145. Conventionally, if the user device 105 is in the idle state when a voice call is initiated, the user device 105 enters the connected state, which involves reestablishing a radio connection with an LTE cell 120. Once the user device 105 is in the connected state, the MME 130 performs the handover to an MSC 125. Re-establishing a radio connection to the LTE network 150 and performing the handover procedure can take up to a second to complete.

In one embodiment, user device 105 includes a circuit switched (CS) fallback module 110. While the user device 105 is in the idle state, the CS fallback module 110 may control the handover procedure from the LTE network 150 to the CS domain network 145. Accordingly, the CS fallback module 110 may perform reselection (the process of selecting and connecting to a new cell) to connect to a legacy cell 115. If the user device 105 receives a request to initiate a voice call while the user device 105 is in the idle state, the user device 105 does not establish an active radio connection with an LTE cell 120. Instead, the CS fallback module 110 selects a legacy cell 115 of a CS domain network 145 to connect to. The CS fallback module 110 then establishes a radio connection with the selected legacy cell 115. By connecting directly to the CS domain network 145 without first reestablishing an active connection with the LTE network 150, the CS fallback module 110 can significantly reduce setup time for establishing a voice call connection.

Figure 2:
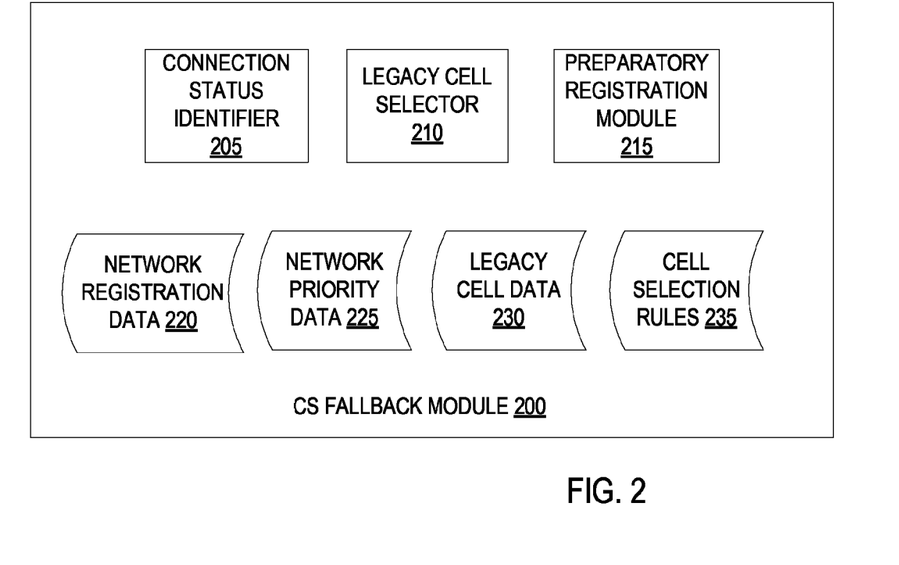
FIG. 2 is a block diagram of one embodiment of a circuit switched fallback module.

FIG. 2 is a block diagram of one embodiment of a CS fallback module 200 hosted by a user device. In one embodiment, CS fallback module 200 corresponds to CS fallback module 110 of FIG. 1. The CS fallback module 200 may include a connection status identifier 205, a legacy cell selector 210 and a preparatory registration module 215. The components of the CS fallback module 200 may represent modules that can be combined together or separated into further modules, according to some embodiments.

Connection status identifier 205 determines whether a user device is in an idle state or a connected state when a voice call or other circuit switched service is to be initiated. The voice call (or other circuit switched service) may be initiated based on a command of a user of the user device. If the user device is in the connected state, CS fallback module 200 may not perform any additional actions. If the user device is in the idle state, legacy selector 210 selects a legacy cell to establish a radio connection with. The user device may then establish a radio connection with the selected legacy cell, and then initiate a voice call or other circuit switched service.

The legacy cell selector 210 may use various data to determine a best cell to connect to. This data may include legacy cell data 230, network priority data 225 and/or network registration data 220. The various data may be stored in a subscriber identity module (SIM) card attached to the user device, in a memory (e.g., in random access memory (RAM), read only memory (ROM), Flash memory, etc.) of the user device, and/or in secondary storage (e.g., in a disk drive, solid state drive, etc.) of the user device. In one embodiment, legacy cell selector 210 detects and/or measures a legacy cell on a periodic basis. The legacy cell selector 210 may additionally preselect a legacy cell based on the periodic detection and/or measurement. In another embodiment, legacy cell selector 210 selects a legacy cell in response to receiving a request to initiate a voice call or other CS service.

The legacy cell data may include measurement information on signal strengths, signal to noise ratios (SNRs), latencies, packet loss, etc. for multiple legacy cells and/or for multiple radio frequencies. The user device may continuously or periodically make measurements to gather such legacy cell data 230 while the user device is in an idle state or in a connected state. Legacy cell selector 210 uses the legacy cell data 230 to select a legacy cell. For example, legacy cell selector 210 may select a legacy cell having a highest signal strength. In one embodiment, the legacy cell data 230 includes a signal quality rating, which the user device may derive from the measurement information. The signal quality rating may be derived based on signal strength, SNR, latency, packet loss, etc.

In one embodiment, the user device 230 performs a combined attach when it attaches to the LTE network. The combined attach is a registration procedure that registers the user device with both the LTE network and with a CS domain network. Once the combined attach is completed, the user device is registered with a specific MME of the LTE network and with a specific MSC of the CS domain network. The network registration data 220 may include an identity of an MSC (e.g., a location area code of an MSC) with which the user device is currently registered.

During (or as a result of) the registration process with a circuit switched network using a radio connection on the packet switched network (e.g. from combined attach), the packet switched network may provide network priority data 225 to the user device. This network priority data may include network priority data for the LTE network as well as network priority data for the circuit switched network. Additionally, or in the alternative, the user device may have received network priority data 225 from the circuit switched network during a previous connection with the circuit switched network. Network priority data 225 may be received in system information (e.g., that may be periodically received while the user device is in an idle state) and/or in a signaling control message (e.g., when the device is in a connected state) as part of a neighbor cell list. The user device may store this network priority data 225 and later use it to select a legacy cell. The network priority data 225 may indicate specific radio frequencies to prioritize over other radio frequencies, specific legacy cells to prioritize over other legacy cells, and so forth. The network priority data 225 may additionally or alternatively include specific cell selection algorithms to use in selecting a legacy cell. The cell selection algorithms may use the legacy cell data 230 as inputs, and identify a legacy cell to select based on the legacy cell data 230.

In one embodiment, legacy cell selector 210 applies one or more cell selection rules 235 to select a legacy cell. Each cell selection rule may include a criterion or criteria for selecting a legacy cell. In one embodiment, cell selection rules 235 include a network registration rule. The network registration rule causes the legacy selector 210 to select a legacy cell associated with an MSC with which the user device is registered. To apply the network registration rule, legacy cell selector determines whether any available legacy cell is controlled by an MSC with which the user device is registered. If such a legacy cell is identified, legacy cell selector may select that legacy cell. If no such legacy cell is identified, then legacy cell selector may apply a different cell selection rule 235.

In one embodiment, cell selection rules 235 include a network priority rule 225. If network priority data 225 is available, then legacy cell selector 210 may select a cell based on the network priority data 225. This may include selecting a cell that uses a prioritized frequency, or applying a cell selection algorithm included in the network priority data 225 on legacy cell data 230 to determine a legacy cell to select. In one embodiment, the network priority rule 225 includes a geographic location limiter and an expiration threshold. If the stored network priority data 225 is for a different geographic area than a current geographic area, the network priority data 225 may not be used. Additionally, if the stored network priority data 225 is older than an expiration threshold, then the network priority data may not be used. If the user device does not include any network priority data 225, or the user device includes network priority data 225 that will not be used, then legacy selector 210 may apply a different selection rule 235.

In one embodiment, cell selection rules 235 include a wireless communication technology selection rule. This rule causes certain types of CS domain networks to be chosen over other types of CS domain networks. In one embodiment, the wireless communication technology selection rule causes legacy cells for 3G networks to be chosen over legacy cells for 2G networks.

The cell selection rules 235 may be ordered, so that a second cell selection rule is applied if criteria associated with a first cell selection rule are not satisfied, and so on. In one embodiment, the network registration selection rule has a highest order, the network priority data selection rule has an intermediate order, and the wireless communication technology selection rule is ordered last.

In one embodiment, the cell selection rules 235 include weighting rules. For example, the cell selection rules 235 may include a network priority data weighting rule that weights available legacy cells based on the network priority data. A signal quality weighting rule may weight legacy cells based on signal quality ratings associated with those legacy cells. An MSC weighting rule may weight legacy cells based on an MSC that they are associated with. A network type weighting rule may weight legacy cells based on a type of network that they are associated with (e.g., based on whether they are associated with a 2G network or a 3G network). Legacy cell selector 210 may select a legacy cell having a highest priority rating after some or all weighting rules are applied to available legacy cells.

Figure 3:
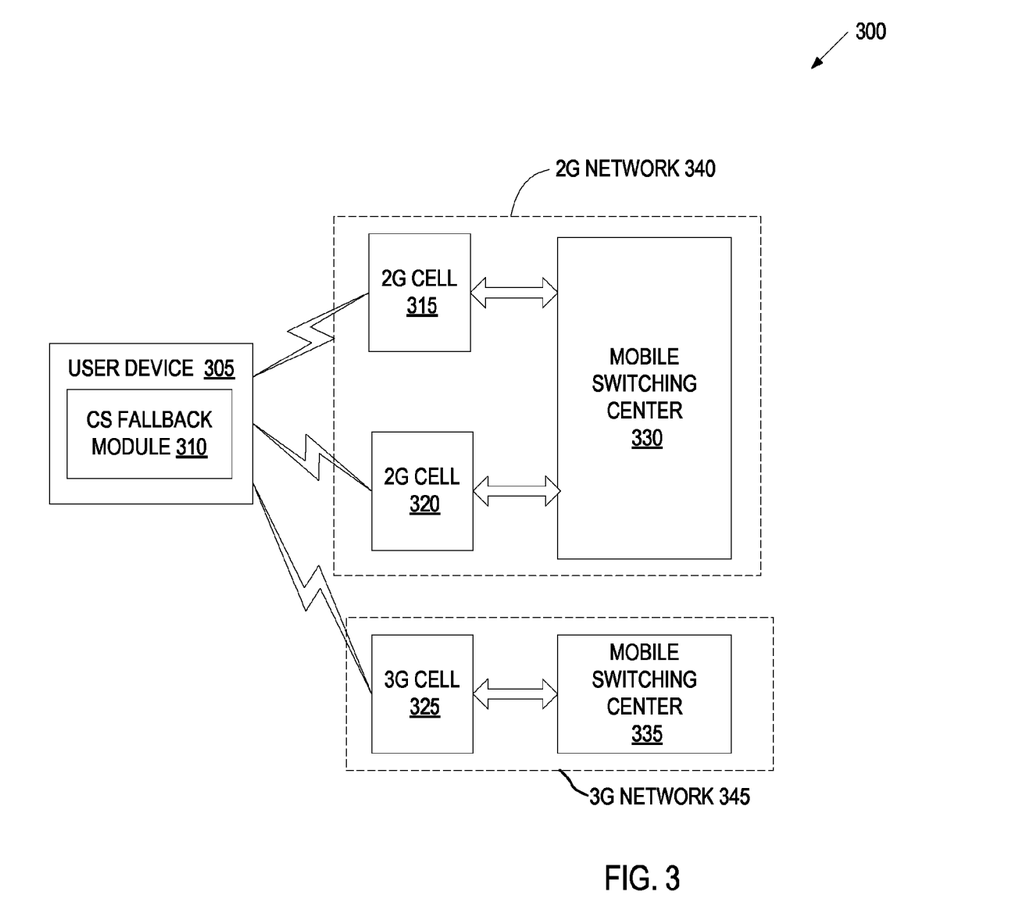
FIG. 3 is a block diagram of an additional exemplary network architecture in which embodiments of the invention may operate.

FIG. 3 is a block diagram of an additional exemplary network architecture 300 in which embodiments of the invention may operate. Network architecture 300 includes a 2G network 340 and a 3G network 345, each of which includes a cell or cells (e.g., 2G cell 315, 2G cell 320 and 3G cell 325) in radio communication distance from a user device 305. The 2G network 340 additionally includes a mobile switching center 330 that controls 2G cell 315 and 2G cell 320, among other components. Similarly, the 3G network 345 includes a mobile switching center 335 that controls 3G cell 325, among other components.

User device 305 may receive a voice call request (or a request for another circuit switched service such as SMS) while the user device 305 is connected to an LTE network (not shown) and in an idle state (e.g., an LTE idle state). In one embodiment, the voice call request (or other CS service request) is received based on user input with the user device. Such a voice call request may cause the user device to establish a mobile originated voice call. In another embodiment, the voice call request (or other CS service request) is received from the LTE network. The request may be included in a paging message that is sent from the LTE network to the user device while the user device is in the idle mode. The paging message may be sent to the user device in response to a remote telephone dialing a phone number associated with the user device, for example. Such a voice call request may cause the user device to establish a mobile terminated voice call.

In response to user device 305 receiving the request for the voice call or other CS service, the CS fallback module 310 may select 2G cell 315, 2G cell 320, or 3G cell 325 to establish a radio connection with. Alternatively, the CS fallback module 310 may perform CS legacy cell detection, measurement and/or selection prior to receiving the request. If the user device 305 earlier performed a combined attach with the LTE network, then the user device 305 will be registered with an MSC of the 3G network 345 or the 2G network 340. CS fallback module 310 may determine whether user device 305 is registered with MSC 330 or MSC 335. If user device 305 is registered with MSC 335, then CS fallback module 310 may select 3G cell 325 to connect to, in accordance with a first cell selection rule. If user device 305 is registered with MSC 330, then CS fallback module 310 may select 2G cell 315 or 2G cell 320 to connect to, in accordance with the first cell selection rule. By connecting to a cell associated with an MSC to which the user device 305 is already registered, the user device 305 avoids an additional registration step. This may further reduce a voice call setup time.

If CS fallback module 310 does not detect any cells associated with an MSC with which the user device 310 is registered, or if the CS fallback module 310 detects multiple cells associated with an MSC with which the user device 305 is registered, CS fallback module 310 may apply one or more additional cell selection rules. In one embodiment, CS fallback module 310 determines whether user device has received any network priority data associated with 2G network 340 and/or 3G network 345. If network priority data has been received, CS fallback module 310 may select an available cell based on the network priority data. For example, 2G cell 315 may operate on a first frequency and 2G cell 320 may operate on a second frequency. The network priority data may specify that the first frequency should be prioritized over the second frequency. In such an instance, CS fallback module 310 may select the 2G cell 315 for communication rather than 2G cell 320, even if there is a stronger signal with 2G cell 320. If user device 305 does not include any network priority data, or if user device 305 includes inapplicable network priority data, CS fallback module 310 may select a cell having a strongest signal. Alternatively, or in addition, CS fallback module 310 may select a 3G cell 325 over a 2G cell 315, 320 if both 3G cells and 2G cells are available. The 3G network 345 may be preferable to the 2G network, for example, because the 3G network may allow concurrent use of circuit switched services and packet switched services by user device 305.

Figure 4:
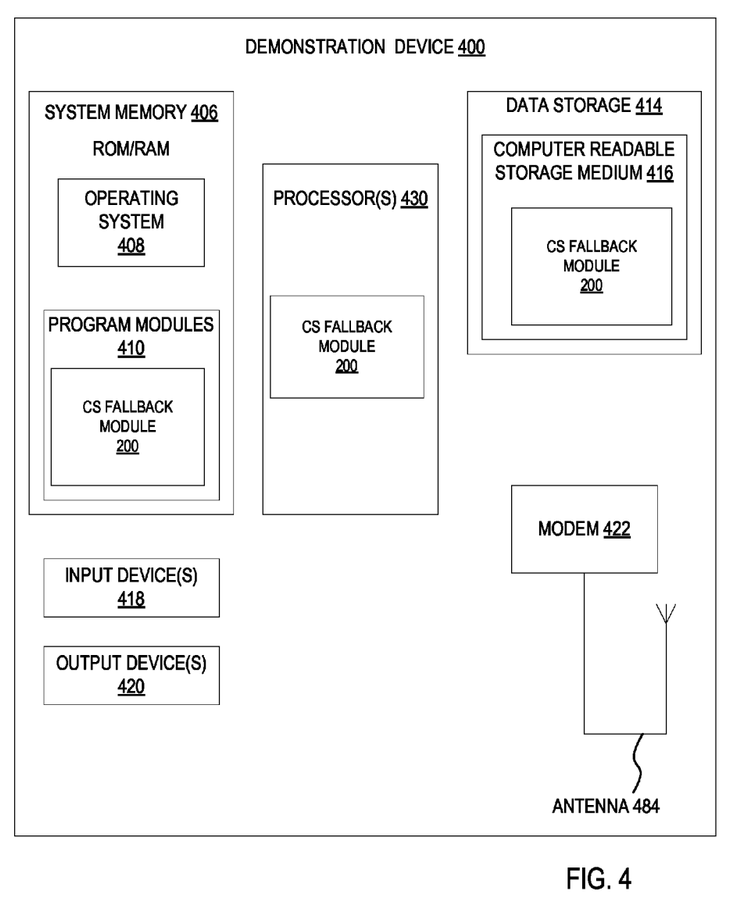
FIG. 4 is a block diagram illustrating an exemplary user device.

FIG. 4 is a block diagram illustrating an exemplary user device 400, in accordance with one embodiment of the present invention. In one embodiment, user device 400 corresponds to user device 105 of FIG. 1. The user device 400 includes one or more processors 430, such as one or more CPUs. The user device 400 also includes system memory 406, which may correspond to any combination of volatile and/or non-volatile storage mechanisms. The system memory 406 may store information which provides an operating system component 408, various program modules 410 including CS fallback module 200, and/or other components. The user device 400 performs functions by using the processor(s) 430 to execute, for example, CS fallback module 200.

The user device 400 may also include a data storage device 414 that may consist of one or more types of removable storage and/or one or more types of non-removal storage. The data storage device 414 may include a computer-readable storage medium 416 on which is stored one or more sets of instructions (e.g., instructions of the CS fallback module 200) embodying any one or more of the methodologies or functions described herein. As shown, instructions of the CS fallback module 200 may also reside, completely or at least partially, within the system memory 406 and/or within the processor(s) 430 during execution thereof by the user device 400, the system memory 406 and the processor(s) 430 also constituting computer-readable storage media.

The user device 400 may also include one or more input devices 418 (keyboard, mouse device, specialized selection keys, etc.) and one or more output devices 420 (displays, printers, audio output mechanisms, etc.). The user device 400 may further include a wireless modem 422 to allow the user device 400 to communicate via a wireless network with legacy cells and/or LTE cells. The wireless modem 422 may allow the user device 400 to receive a telephone ring and also communicate in a data mode. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, long term evaluation (LTE) and WiMax.

The above-enumerated list of modules is representative and is not exhaustive of the types of functions performed by the user device 400. The user device 400 may also include additional functions.

Figure 5:
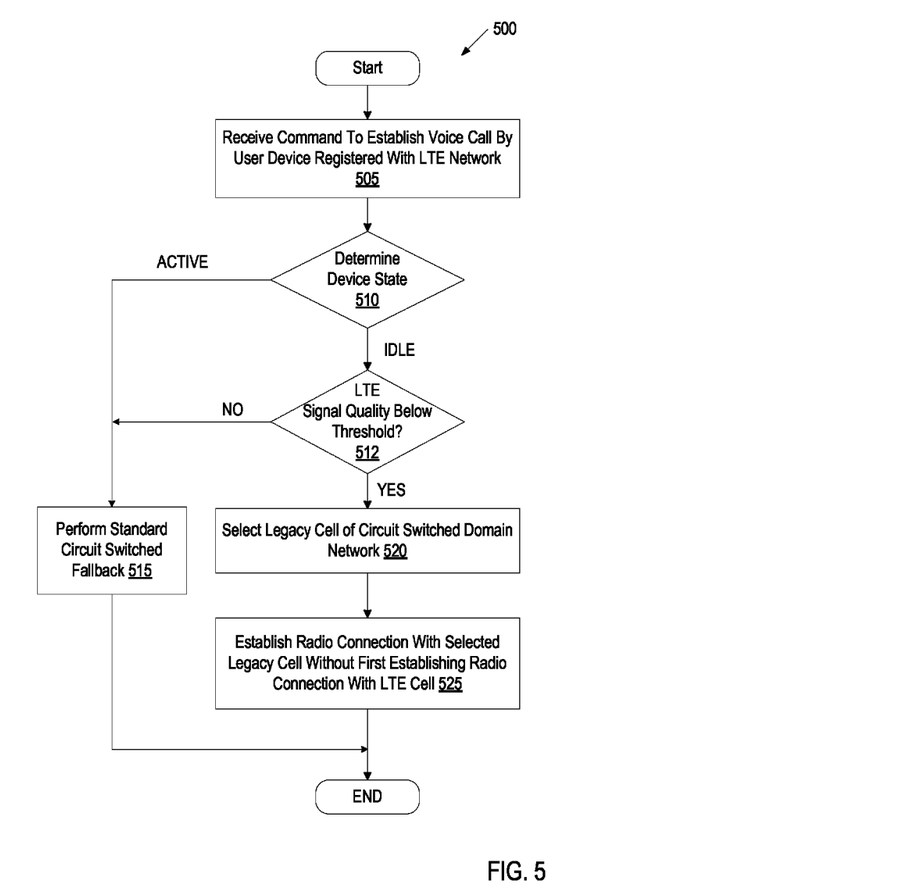
FIG. 5 is a flow diagram of one embodiment of for method of optimizing a voice call setup time.
Figure 6:
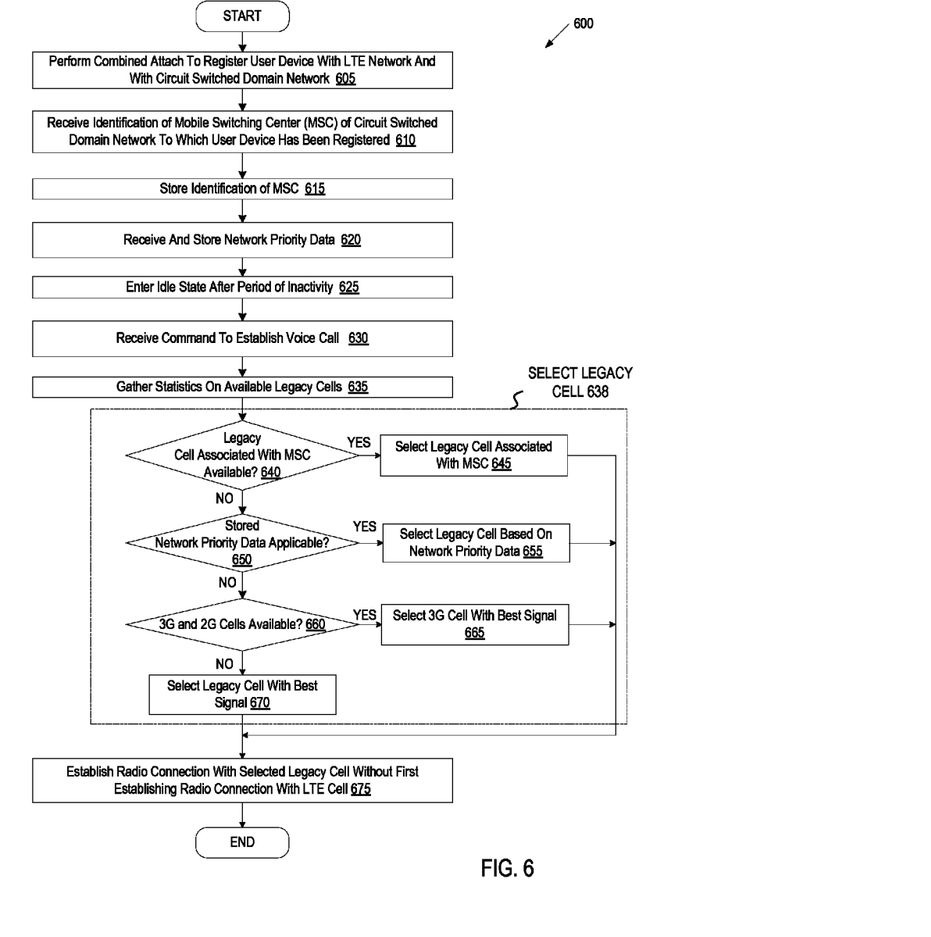
FIG. 6 is a flow diagram of another embodiment for a method of optimizing a voice call setup time.
Figure 7:
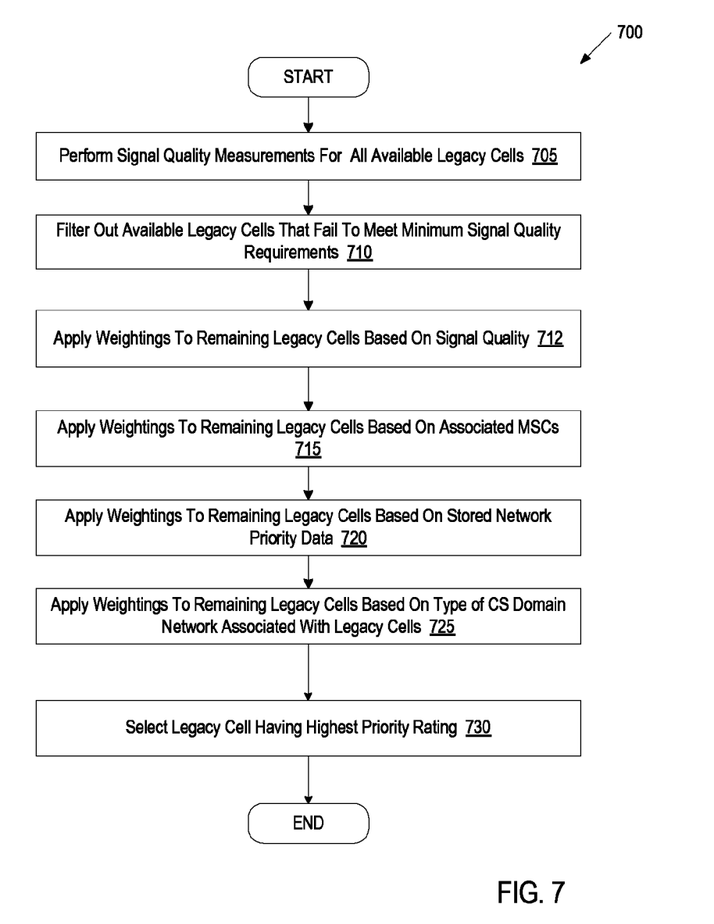
FIG. 7 is a flow diagram of one embodiment for a method of selecting a legacy cell.

FIGS. 5-7 are flow diagrams of some embodiments of methods performed by a user device. The methods are performed by processing logic that may comprise hardware (circuitry, dedicated logic, etc.), software (such as is run on a general purpose computer system or a dedicated machine), or a combination of both. In one embodiment, at least some operations of the methods are performed by a CS fallback module 200, as described in FIG. 2.

FIG. 5 is a flow diagram of one embodiment for a method of optimizing a voice call setup time. At block 505, the user device receives a command to establish a voice call or other CS service. The user device may be registered to an LTE network. At block 510, processing logic determines whether the user device is in a connected state (e.g., an LTE-Active state) or an idle state (e.g., an LTE-idle state). If the user device is in a connected state, the method proceeds to block 515. If the user device is in an idle state, the method may continue to block 512. In one embodiment, if the user device is in an idle state, the method proceeds to block 520 and skips block 512.

At block 515, processing logic performs a standard circuit switched fallback, in which the user device establishes a connection to the LTE network, and the LTE network facilitates the set up of a connection between the user device and a circuit switched network. This may include sending a CS service request (e.g., a voice call request or an SMS request) to the LTE network along with measurement reports on neighbor 2G and/or 3G cells. The LTE network then selects a neighbor legacy cell (e.g., a 2G or 3G cell) and performs a handover procedure to cause the user device to connect to the selected legacy cell.

At block 512, processing logic determines whether the signal quality (e.g., signal strength) to the LTE network (e.g., to a closest LTE cell) is below a threshold. The signal quality to the LTE network identifies whether a traditional circuit switched fallback would be impractical. For example, if the signal quality is very low, then the user device may be unable to establish an active connection to the LTE network, or may establish a connection that is slow and that experiences a high packet loss rate. Accordingly, the signal quality may be used to determine whether to rely on traditional CS fallback, or to initiate an autonomous CS fallback by a user device without communicating with the LTE network. If the signal quality is at or below the threshold, the method continues to block 520. If the signal quality is above the threshold, then the method continues to block 515.

At block 520, processing logic selects a legacy cell of a circuit switched network (e.g., of a 3G network or a 2G network). Processing logic may perform the cell selection autonomously without receiving any cell selection instructions from the LTE network or from any circuit switched network. The selection may be based on one or more cell selection rules, each of which may contain a criterion or criteria for performing cell selection. In one embodiment, each of the cell selection rules applies a weighting to some or all of the available legacy cells. The legacy cell having a highest priority after all weightings have been assigned may be selected. At block 525, processing logic establishes a radio connection with the selected legacy cell without first establishing a radio connection with an LTE cell of the LTE network. After establishing the radio connection, the user device may initiate the voice call or other CS service. If the user device is not already registered to an MSC associated with the selected legacy cell, the user device may perform registration before initiating the voice call.

FIG. 6 is a flow diagram of another embodiment for a method of optimizing a voice call setup time. At block 605, processing logic performs a combined attach to register the user device with an LTE network and with a circuit switched network. At block 610, processing logic receives identification of an MSC of the circuit switched network to which the user device has been registered. At block 615, processing logic stores the identification of the MSC. At block 620, processing logic receives and stores network priority data associated with the circuit switched network. The network priority data may be received while the user device is connected to the LTE network. Additionally, network priority data may have been received and stored while the user device was previously connected to a circuit switched network. At block 625, the user device enters an idle state after a period of inactivity.

At block 630, processing logic receives a command to establish a voice call. At block 635, processing logic gathers statistics and/or additional measurement information on available legacy cells. In one embodiment, the measurement information was previously generated, and is retrieved from storage. In one embodiment, the measurement information is generated after receiving the command to establish the voice call. At block 640, processing logic determines whether a cell associated with the MSC to which the user device is registered is available. If a legacy cell controlled by the MSC is available, the method proceeds to block 645, and processing logic selects a cell associated with the MSC. If multiple legacy cells associated with the MSC are available, processing logic may select one of the legacy cells that has a strongest signal. If no legacy cell controlled by the MSC is available, the method continues to block 650.

At block 650, processing logic determines whether the stored network priority data is applicable. The network priority data may be applicable if the network priority data has not expired, if the network priority data is for a geographic location that corresponds to a current geographic location, etc. If the stored network priority data is applicable, the method proceeds to block 655, and processing logic selects a legacy cell based on the network priority data 655. If the stored network priority data is not applicable, the method proceeds to block 660.

At block 660, processing logic determines whether both 3G cells and 2G cells are available. If both 3G cells and 2G cells are available, the method proceeds to block 665, and processing logic selects an available 3G cell with a best signal (e.g., strongest signal, lowest signal to noise ratio, lowest latency, etc.). If only 3G cells or only 2G cells are available, the method continues to block 670. At block 670, processing logic selects a legacy cell with a best signal. Blocks 640-670 may be components of block 638, in which processing logic selects a legacy cell.

At block 675, processing logic establishes a radio connection with the selected legacy cell without first establishing a radio connection with an LTE cell. The method then ends.

FIG. 7 is a flow diagram of one embodiment for method 700 of autonomously selecting a cell by a user device (commonly referred to as reselection). In one embodiment, method 700 is performed at block 638 of method 600 in place of blocks 640-670. In one embodiment, method 700 is performed after receiving a request to initiate a voice call or other CS service. In another embodiment, method 700 is performed before a request to initiate a voice call or other CS service is received. For example, method 700 may be periodically performed while the user device is registered with the LTE network and in an idle or connected state (e.g., after performing neighbor cell measurements). By preselecting a legacy cell, the user device may further reduce a call setup time.

At block 705 of method 700, processing logic identifies all available legacy cells and performs signal quality measurements for the identified legacy cells. The signal quality measurements may include measurements of signal to noise ratio, signal strength, latency, and so forth. At block 710, processing logic filters out available legacy cells that fail to meet minimum signal quality requirements. For example, any cells for which a signal strength below approximately −105 dBm may be filtered out.

At block 712, processing logic applies weighting to the remaining legacy cells based on signal quality.

At block 715, processing logic applies weightings to the remaining legacy cells based on associated MSCs. In one embodiment, legacy cells associated with an MSC that the user device is registered to are assigned a first weighting, and legacy cells associated with all other MSCs are assigned a second lower weighting. For example, a priority rating for legacy cells associated with the MSC to which the user device is registered may be multiplied by 1, while a priority rating for legacy cells associated with other MSCs may be multiplied by 0.5.

At block 720, processing logic applies weightings to the remaining legacy cells based on stored network priority data. The stored network priority data may assign values to the available legacy cells based on one or more parameters and/or prioritization algorithms included in the network priority data. In one embodiment, processing logic normalizes the values assigned to the legacy cells by the network priority data, and then weights the legacy cells based on the normalized values. For example, a legacy cell that was assigned a highest value by the network priority data may be normalized to 1, and other legacy cells may be normalized to less than one. Processing logic may then adjust a weighting of a legacy cell by multiplying the priority rating by the normalized value.

At block 725, processing logic applies weightings to the remaining legacy cells based on CS domain networks associated with those legacy cells. In one embodiment, a first weighting is applied to legacy cells associated with a 3G network, and a second lower weighting is applied to legacy cells associated with a 2G network.

At block 730, processing logic selects a legacy cell having a highest priority rating. The method then ends.

Figure 8:
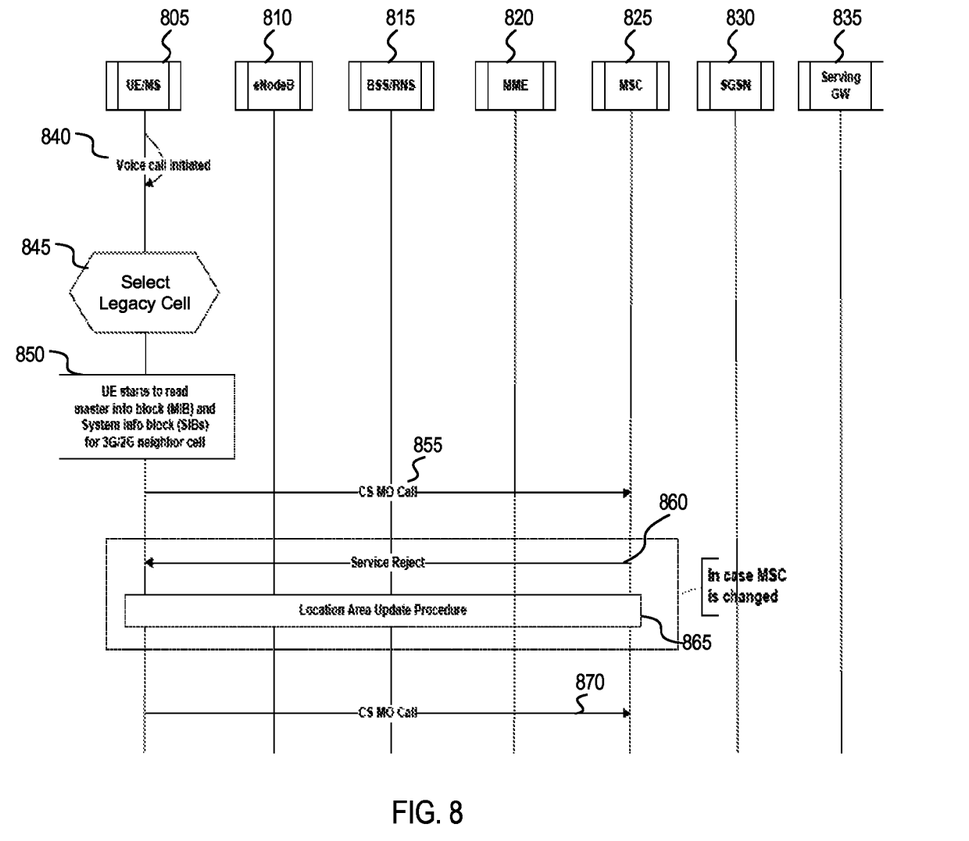
FIG. 8 is a sequence diagram showing a circuit switched fallback procedure, in accordance with one embodiment of the present invention.

FIG. 8 is a sequence diagram showing a user device controlled circuit switched fallback procedure, in accordance with one embodiment of the present invention. The sequence diagram shows user equipment (UE) 805, an eNodeB 810 of an LTE network, a base station subsystem (BSS) 815 of a 2G or 3G network, an MME 820 of the LTE network, an MSC 825 of a CS domain network, a serving GPRS support node (SGSN) 830 of the CS domain network and a serving gateway 835 of the LTE network.

A user initiates a voice call from a UE 805 at block 840. At block 845, the UE 805 identifies a suitable 2G or 3G cell that is available, and selects the identified cell. At block 850, the UE 805 prepares to send a connection request (e.g., a circuit switched (CS) mobile originating (MO) call request) to the selected cell. This may include reading a master info block (MIB) and a system info block (SIB) for the selected cell.

At block 855, the UE 805 sends a CS MO call request to an MSC 825 that controls the selected cell. If the UE 805 is already registered with the MSC, then the MSC 825 sets up a voice call for the UE 805. If the UE 805 is not registered with the MSC 825, the MSC sends a service reject response to the US 805 at block 860. In response, the UE performs a location area update procedure or otherwise registers with the MSC at block 865. The UE 805 may then send another CS MO call request to the MSC 825 at block 870.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "establishing", "adding", "selecting", "storing", "performing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
    performing, by a user device, a combined attach to register the user device with a packet switched network and with a circuit switched network;
    receiving and storing network priority data and an identification of a mobile switching center (MSC) of the circuit switched network;
    receiving a command to establish a voice call while the user device is in an idle state on the packet switched network;
    applying a network registration selection rule that determines whether any legacy cell associated with the MSC is available and assigns a highest priority to a first legacy cell associated with the MSC if the first legacy cell is available;
    determining that no legacy cell associated with the MSC is available;
    applying a network priority rule, wherein the network priority rule assigns the highest priority to a second legacy cell based on a prioritized frequency identified in the network priority data if the network priority data is not older than an expiration threshold;
    responsive to determining that the network priority data is older than the expiration threshold, applying a wireless communication technology selection rule that assigns the highest priority to a third legacy cell based on a wireless communication technology of the third legacy cell;
    selecting, based on a determined priority, a particular legacy cell of the circuit switched network having the highest priority; and establishing a radio connection with the selected legacy cell without first establishing a radio connection with the packet switched network.

2. The computer-implemented method of claim 1, wherein the network priority data comprises first network priority data associated with the packet switched network and second network priority data associated with the circuit switched network.

3. The computer-implemented method of claim 1, wherein applying the wireless communication technology selection rule comprises:
   determining that a second generation wireless communication (2G) network cell and a third generation wireless communication (3G) network cell are available; and
   assigning a higher priority to the 3G network cell than to the 2G network cell.

4. The computer-implemented method of claim 1, wherein applying the network priority rule comprises:
   determining signal qualities of the one or more legacy cells based on measuring signal strengths of the one or more legacy cells; and
   assigning the highest priority to an available legacy cell of the one or more legacy cells having a strongest signal.

5. The computer-implemented method of claim 1, wherein the circuit switched network is one of a second generation wireless communication (2G) network or a third generation wireless communication (3G) network and the packet switched network is a long term evolution (LTE) network.

6. The computer-implemented method of claim 1, wherein the selected legacy cell is at least one of detected or measured before receiving the command to establish the voice call.

7. The computer-implemented method of claim 1, wherein the command is received from the packet switched network.

8. The computer-implemented method of claim 1, further comprising:
   storing signal quality information of the one or more legacy cells, wherein a signal quality of the selected legacy cell is determined based on the stored signal quality information.

9. The computer-implemented method of claim 1, further comprising:
   determining a signal quality for each of the one or more legacy cells of the circuit switched network;
   wherein applying the network priority rule comprises prioritizing the one or more legacy cells of the circuit switched network based on the signal quality for each of the plurality of legacy cells of the circuit switched network.

10. A non-transitory computer readable storage medium including instructions that, when executed by a processing device of a user device, cause the processing device to perform operations comprising:
   performing, by the processing device of the user device, a combined attach to register the user device with a packet switched network and with a circuit switched network;
   receiving a command to initiate a circuit switched service while the user device is in an idle state on the packet switched network;
   applying a network registration selection rule that determines whether any legacy cell associated with a particular mobile switching center (MSC) is available and assigns a highest priority to a first legacy cell associated with the particular MSC if the first legacy cell is available;
   determining that no legacy cell associated with the MSC is available;
   applying a network priority rule, wherein the network priority rule assigns the highest priority to a second legacy cell based on a prioritized frequency identified in network priority data if the network priority data is not older than an expiration threshold;
   responsive to determining that the network priority data is older than the expiration threshold, applying a wireless communication technology selection rule that assigns the highest priority to a third legacy cell based on a wireless communication technology of the third legacy cell;
   selecting, based on a determined priority, a particular legacy cell of the circuit switched network having a highest priority; and
   attempting to establish a radio connection with the selected legacy cell without first establishing a radio connection with the packet switched network.

11. The non-transitory computer readable storage medium of claim 10, the operations further comprising:
   receiving an identification of the particular MSC of the circuit switched network to which the user device has been registered; and
   storing the identification of the particular MSC.

12. The non-transitory computer readable storage medium of claim 10, the operations further comprising:
   receiving the network priority data from the circuit switched network; and
   storing the network priority data.

13. The non-transitory computer readable storage medium of claim 10, wherein applying the wireless communication technology selection rule comprises:
   determining that a second generation wireless communication (2G) network cell and a third generation wireless communication (3G) network cell are available; and
   selecting the 3G network cell.

14. The non-transitory computer readable storage medium of claim 10, the operations further comprising:
   while in the idle state, measuring signal quality of the one or more legacy cells; and
   assigning the highest priority to an available legacy cell of the one or more legacy cells having a signal quality that satisfies a minimum signal quality threshold.

15. The non-transitory computer readable storage medium of claim 10, wherein the circuit switched network is one of a second generation wireless communication (2G) network or a third generation wireless communication (3G) network and the packet switched network is a long term evolution (LTE) network.

16. The non-transitory computer readable storage medium of claim 10, the operations further comprising:
   selecting the legacy cell after determining that a signal quality for a serving cell of the packet switched network is below a threshold value.

17. The non-transitory computer readable storage medium of claim 10, wherein the selected legacy cell is at least one of detected or measured before receiving the command to initiate the circuit switched service.

18. The non-transitory computer readable storage medium of claim 10, wherein the command is received from the packet switched network.

19. The non-transitory computer readable storage medium of claim 10, the operations further comprising:
   storing signal quality information of the one or more legacy cells; and
   selecting an available legacy cell of the one or more legacy cells having a highest signal quality based on the stored signal quality information.

20. A user device comprising:
a memory to store instructions to perform circuit switched fallback; and a processor, coupled to the memory, configured to:
perform a combined attach to register the user device with a packet switched network and with a circuit switched network;
receive a command to establish a voice call while the user device is in an idle state on the packet switched network;
apply a network registration selection rule that determines whether any legacy cell associated with a particular mobile switching center (MSC) is available and assigns a highest priority to a first legacy cell associated with the particular MSC if the first legacy cell is available;
determine that no legacy cell associated with the MSC is available;
apply a network priority rule, wherein the network priority rule assigns the highest priority to a second legacy cell based on a prioritized frequency identified in network priority data if the network priority data is not older than an expiration threshold;
responsive to determining that the network priority data is older than the expiration threshold, apply a wireless communication technology selection rule that assigns the highest priority to a third legacy cell based on a wireless communication technology of the third legacy cell;
select, based on a determined priority, a particular legacy cell of the circuit switched network having a highest priority; and
establish a radio connection with the selected legacy cell without first establishing a radio connection with a serving cell of the packet switched network.

21. The user device of claim 20, wherein the processor is further configured to:
receive an identification of the particular MSC of the circuit switched network to which the user device has been registered; and
store the identification of the particular MSC.

22. The user device of claim 20, wherein the processor is further configured to:
receive the network priority data from the circuit switched network; and
store the network priority data.

23. The user device of claim 20, wherein applying the wireless communication technology selection rule comprises:
determining that a second generation wireless communication (2G) network cell and a third generation wireless communication (3G) network cell are available; and
selecting the 3G network cell.

24. The user device of claim 20, wherein the processor is further configured to:
measure signal quality of the one or more legacy cells; and
prioritize the available legacy cells based on at least one of an associated MSC, signal quality, network priority data or network type.

25. The user device of claim 20, wherein the processor is further configured to:
store signal quality information of the one or more legacy cells; and
select an available legacy cell of the one or more legacy cells having a highest signal quality based on the stored signal quality information.

\* \* \* \* \*